United States Patent [19]
Suzuki

[11] Patent Number: 5,517,364
[45] Date of Patent: May 14, 1996

[54] DRIVE DEVICE, LENS BARREL AND CAMERA

[75] Inventor: Ryuji Suzuki, Kanagawa, Japan

[73] Assignee: Canon Kabushiki Kaisha, Tokyo, Japan

[21] Appl. No.: 411,154

[22] Filed: Mar. 27, 1995

[30] Foreign Application Priority Data

Mar. 30, 1994 [JP] Japan .................................. 6-085947

[51] Int. Cl.[6] .................................................. G02B 7/02
[52] U.S. Cl. ........................... 359/823; 359/696; 354/485; 354/271.1; 74/89.13
[58] Field of Search ........................................ 359/822, 823, 359/824, 825, 696; 354/485, 271.1, 400; 74/89.13, 89.2, 89.16

[56] References Cited

U.S. PATENT DOCUMENTS

| | | | |
|---|---|---|---|
| 4,730,901 | 3/1988 | Suzuki et al. | 359/824 |
| 4,865,432 | 9/1989 | Aoyagi et al. | 359/696 |
| 4,911,533 | 3/1990 | Suzuki et al. | 359/824 |
| 4,922,274 | 5/1990 | Yamamoto et al. | 354/271.1 |
| 5,227,829 | 7/1993 | Imanari et al. | 354/400 |
| 5,251,466 | 10/1993 | Chang | 74/89.13 |
| 5,309,780 | 5/1994 | Schmitt | 74/89.13 |
| 5,386,740 | 2/1995 | Nomura et al. | 74/89.16 |
| 5,392,159 | 2/1995 | Sasaki et al. | 359/823 |
| 5,453,807 | 9/1995 | Iizuka | 359/823 |

FOREIGN PATENT DOCUMENTS 2-282214  11/1990  Japan .

*Primary Examiner*—Loha Ben
*Attorney, Agent, or Firm*—Fitzpatrick, Cella, Harper & Scinto

[57] ABSTRACT

In a drive device having a drive unit which is mounted on a body of the drive device, a rotary scale such as a pulse disc which is disposed at the drive unit and a light-emitting element and a light-receiving element which are arranged on a circuit board of the body in a state of confronting each other through the pulse disc, the drive unit includes a first transmission member which has a rotation shaft arranged to be substantially orthogonal relative to the circuit board and a second transmission member which is connected to the first transmission member and is arranged to rotate in synchronism with the rotation of the first transmission member, the second transmission member having a rotation shaft arranged to be substantially orthogonal relative to the rotation shaft of the first transmission member, and the pulse disc is connected to the second transmission member.

9 Claims, 2 Drawing Sheets

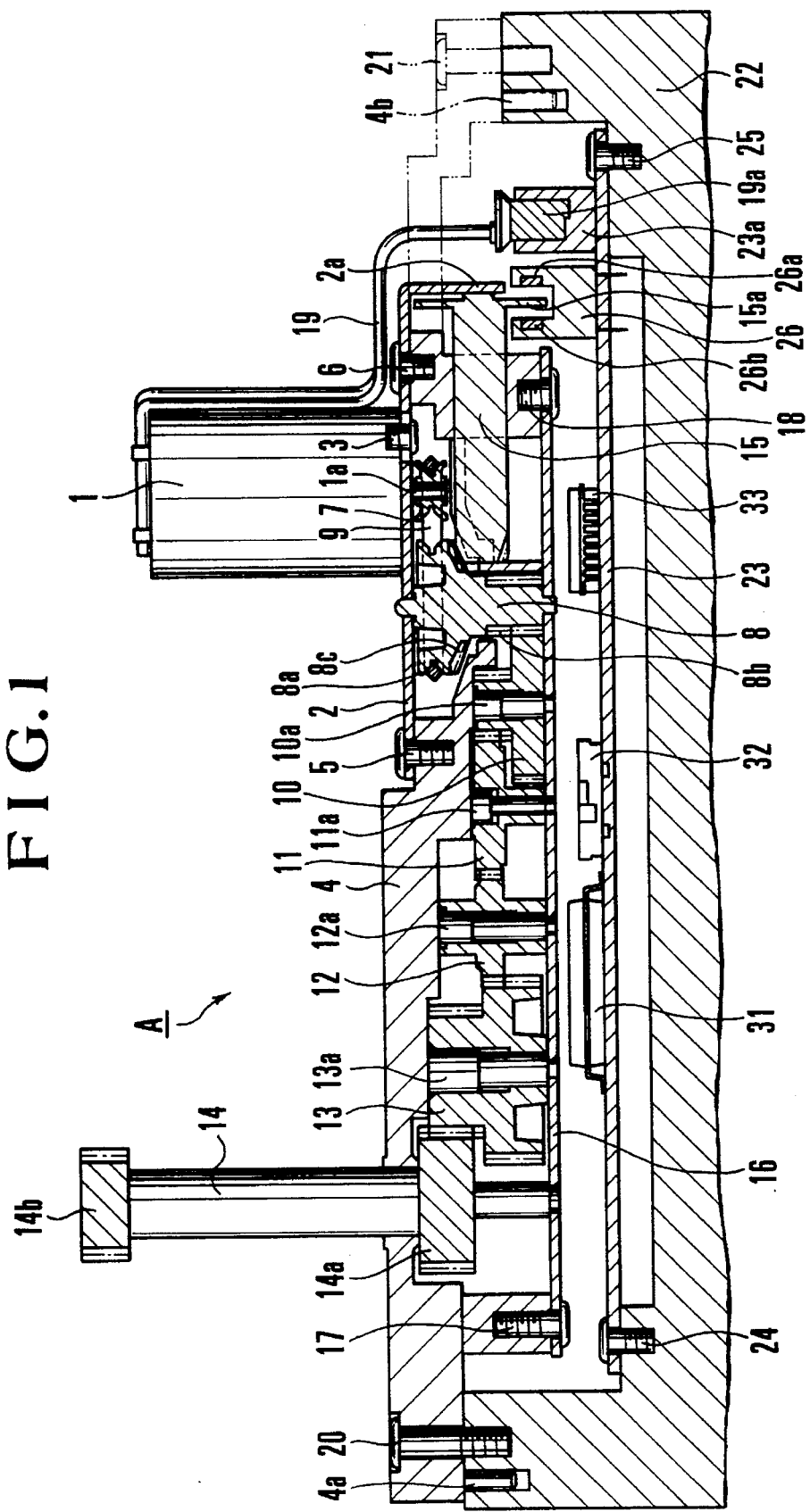

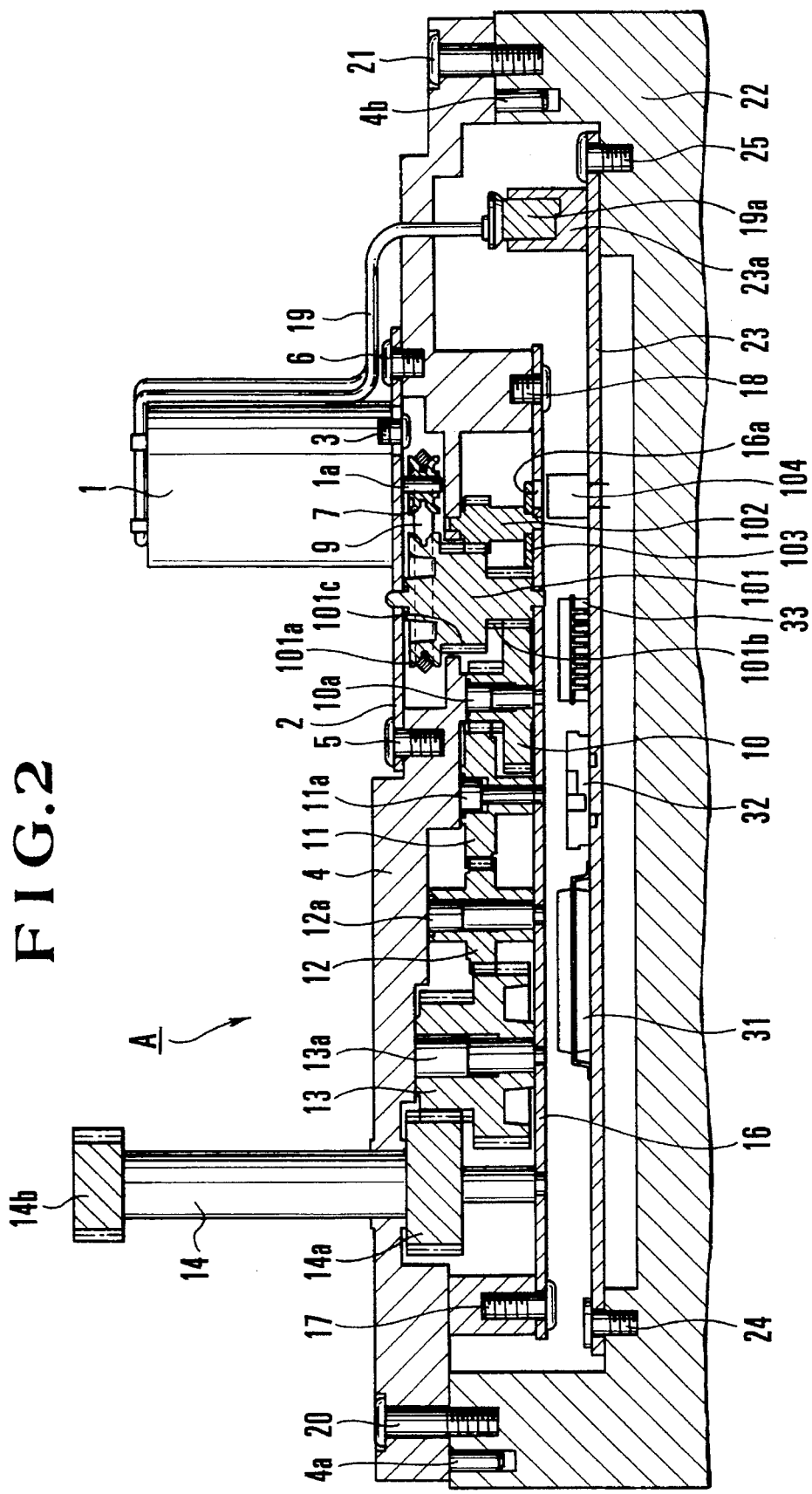

DRIVE DEVICE, LENS BARREL AND CAMERA

BACKGROUND OF THE INVENTION

1. Field of the Invention

This invention relates to a drive device, a lens barrel and a camera, and more particularly to a drive device arranged to transmit rotation of a rotation shaft of a motor to a gear or the like and to drive a lens in the direction of an optical axis by using the gear.

2. Description of the Related Art

Rotation amount detecting means for detecting the amount of rotation of the output shaft of a motor or that of a gear connected to the output shaft has been arranged to include a pulse disc (rotary scale) and an optical sensor, such as a photo-interrupter or a photo-reflector, which is arranged to detect the rotation of the pulse disc. The lead wires of the optical sensor and the lead wires of the motor which is a drive source are connected to a flexible printed circuit board to form a motor drive unit.

In incorporating the motor drive unit into a lens barrel, the flexible printed circuit board is electrically connected to a printed circuit board having a lens control circuit arranged within the lens barrel.

However, since the flexible printed circuit board is expensive, the use of it has hindered an attempt to reduce the cost of the product.

Further, in cases where an electric element is included in the motor drive unit, it is necessary to join, by soldering, the electric element to the flexible printed circuit board after assembly work on the motor drive unit.

In soldering, however, the solder tends to spatter around and stick to gears or the like within the motor drive unit to cause inadequate rotation. To prevent spattering of the solder in soldering, it is necessary to have masking. However, the necessity of masking has presented another problem as it causes a great disadvantage in respect to cost of assembly.

SUMMARY OF THE INVENTION

This invention is contrived in view of the above-stated problems of the prior art. It is, therefore, an object of this invention to provide an improved drive device, an improved lens barrel and an improved camera.

To attain this object, a drive device according to this invention has a drive unit mounted on a body of the drive device, a rotary scale such as a pulse disc disposed at the drive unit, and a light-emitting element and a light-receiving element which are arranged on a circuit board of the body in a state of confronting each other through the rotary scale. The drive unit includes a first transmission member which has a rotation shaft arranged to be substantially orthogonal relative to the circuit board and a second transmission member which is connected to the first transmission member and is arranged to rotate in synchronism with the rotation of the first transmission member, the second transmission member having a rotation shaft arranged to be substantially orthogonal relative to the rotation shaft of the first transmission member, and the rotary scale being connected to the second transmission member.

The above and other objects and features of this invention will become apparent from the following detailed description of embodiments thereof taken in connection with the accompanying drawings.

BRIEF DESCRIPTION OF THE DRAWINGS

FIG. 1 is a sectional view showing a drive device of a first embodiment of this invention.

FIG. 2 is a sectional view showing a drive device of a second embodiment of this invention.

DETAILED DESCRIPTION OF THE PREFERRED EMBODIMENTS

FIG. 1 shows in a sectional view a drive device which is arranged according to this invention as a first embodiment thereof. The illustration includes a motor 1. A motor base plate 2 is provided for mounting the motor 1 and is made of metal. A screw 3 is used for mounting the motor 1 on the motor base plate 2. A gear base plate 4 is molded integrally with the shafts 10a, 11a, 12a and 13a for gears, etc. Screws 5 and 6 are used for mounting the motor base plate 2 on the gear base plate 4. A driving pulley 7 is secured by press fitting to the rotation shaft 1a of the motor 1. A driving gear 8 is molded integrally with a driven pulley part 8a, a transmission gear part 8b and a pulse transmission gear part 8c. A belt 9 which is an elastic member is wound on the driving pulley 7 and the driven pulley part 8a of the driving gear 8. A group of transmission (reduction) gears 10 to 13 are arranged to transmit a power generated by the motor 1 to a gear 14a on an output shaft 14 through the driving pulley 7, the belt 9, and the gear part 8b of the driving gear 8.

The output shaft 14 is formed integrally with gears 14a and 14b. A rotating force is transmitted via the gear 14b to a driven member which is not shown but is, for example, a lens driving member (helicoid) disposed within a lens barrel. A focusing or zooming action can be done by moving an applicable lens. A pulse gear 15 is arranged to be in mesh with the pulse transmission gear part 8c of the driving gear 8 and forms a gear train separately from a gear train formed by the transmission gears 10 to 13. The pulse gear 15 and the pulse transmission gear part 8c of the driving gear 8 are arranged to be in a bevel gear coupling state. In other words, there is provided a converting mechanism by which the direction of the rotation axis of the pulse gear 15 is angularly changed 90 degrees with respect to that of the driving gear 8. The rotation axis of the pulse gear 15 is thus caused to be in parallel to a printed circuit board 23.

Meanwhile, the pulse gear 15 is molded integrally with a pulse disc part (an encoder part) 15a which includes intermittent light-blocking parts. The pulse gear 15 is made of a black color material, for the purpose of making pulse light from the pulse disc part 15a easily readable (detectable) by a light-receiving element 26b of a photo-interrupter 26 which will be described later. Light emitted from a light-emitting element 26a of the photo-interrupter 26 is provided to be intermittently blocked by a plurality of light-blocking parts of the pulse disc part 15a. The light-receiving element 26b is arranged to read alternately cutout parts and transmission parts of the pulse disc part 15a, so that the amount of rotation of the pulse gear 15 can be detected.

Further, the pulse gear 15 is set in position by being inserted in between the gear base plate 4 and a rectangular bent piece 2a of the motor base plate in the direction of thrust, in the direction of rotation axis, and is rotatably fitted on the gear base plate 4.

A bearing base plate 16 is arranged to support the gear shafts molded integrally with the gear base plate 4 and to receive the thrust of each gear. The bearing base plate 16 is screwed to the gear base plate 4 by means of screws 17 and 18. Lead wires 19 having connectors are connected to the terminals of the motor 1. A motor drive unit A is formed by these parts indicated by reference numerals 1 to 19.

Screws 20 and 21 are used for securing the motor drive unit A to a fixed member which is, for example, a lens barrel 22. A printed circuit board 23 is arranged to transmit signals to a camera or the like which is not shown. Electric elements 31, 32 and 33 are soldered to the printed circuit board 23.

Screws 24 and 25 are used for mounting the printed circuit board 23 on the lens barrel 22. The photo-interrupter 26 which serves as an optical sensor is secured to the printed circuit board 23 by soldering or the like. The photo-interrupter 26 is oriented relative to the printed circuit board 22 in such a way as to have a U-shaped opening part which includes the light-emitting element 26a and the light-receiving element 26b confront the motor drive unit A. In other words, the U-shaped opening part of the photo-interrupter 26 faces a direction in which the motor drive unit A is assembled onto the lens barrel 22.

Such being the arrangement, the pulse disc part (rotary scale) 15a of the pulse gear 15 the direction of which is changed 90 degrees relative to the direction of the rotation axis of the gears 10 to 13 within the motor drive unit A can be easily inserted into the U-shaped opening part of the photo-interrupter 26 in assembling and incorporating the motor drive unit A into the lens barrel 22.

At that time, if the fitting engagement length of positioning pins 4a and 4b of the gear base plate 4 to be fitted into the lens barrel 22 is arranged to be longer than the amount of insertion of the pulse disc part 15a of the pulse gear 15 into the photo-interrupter 26 obtained after the incorporating work, the incorporating work can be easily carried out without fear of having the pulse disc part 15a impinge on the photo-interrupter 26.

The photo-interrupter 26 transmits a signal from the pulse disc part 15a of the pulse gear 15, i.e., a signal outputted from the light-receiving element 26b, via the printed circuit board 23 to a lens control circuit which is not shown. Each lead wire 19 having a connector is soldered to a terminal part of the motor 1. The connector part 19a of the lead wire 19 is connected to a connector part 23a which is secured to the printed circuit board 23 by soldering. The motor 1 is thus arranged to be drivable. By virtue of the arrangement of the embodiment, use of a flexible printed circuit board becomes no longer necessary to permit reduction in cost. The arrangement also obviates the necessity of a soldering process in assembling the motor drive unit to permit further reduction in cost.

FIG. 2 is a sectional view of a motor drive device arranged as a second embodiment of this invention. In FIG. 2, the same parts as those of the first embodiment shown in FIG. 1 are indicated by the same reference numerals and are omitted from the following description.

Referring to FIG. 2, the rotation of the motor 1 is transmitted to a driving gear 101 via the driving pulley 7 and the belt 9. The driving gear 101 has a driven pulley part 101a, a transmission gear part 101b and a pulse transmission gear part 101c molded integrally therewith. A pulse gear 102 is in mesh with the pulse transmission gear part 101c and forms a gear train separately from the gear train formed by the transmission gears 10 to 13. The second embodiment differs from the first embodiment in that the bevel gear coupling of the first embodiment is replaced with a spur gear coupling.

A pulse disc (reflection type rotary scale) 103 is secured to the pulse gear 102 by press fitting. A portion of the pulse disc 103 is made of a material of a high reflection factor, such as a high brightness aluminum material. The pulse disc 103 has black printed parts of low reflection and high reflection parts alternately arranged in a pattern in the peripheral direction on its surface.

A photo-reflector 104 (reflection-type optical sensor) is secured by soldering to the printed circuit board 23 to be opposed to the pulse disc 103 before the motor drive unit A is incorporated into the lens barrel 22. Further, The bearing base plate 16 is provided with a hole 16a for allowing the photo-reflector 104 and the pulse disc 103 to confront each other.

With the embodiment arranged in this manner, when the motor drive unit A is mounted on the lens barrel 22, the pulse disc 103 confronts the photo-reflector 104 through the hole 16a. As a result, the amount of rotation of the pulse disc 103 can be detected by the photo-reflector 104. A detection signal of the photo-reflector 104 is transmitted to the lens control circuit through the wiring of the printed circuit board 23.

What is claimed is:

1. A drive device comprising:

a drive unit mounted on a body of the drive device;

a rotary scale disposed at said drive unit; and a light-emitting element and a light-receiving element, arranged on a circuit board of said body in a state of confronting each other through said scale, wherein said drive unit includes a first transmission member which has a rotation shaft arranged to be substantially orthogonal relative to said circuit board and a second transmission member which is connected to said first transmission member and is arranged to rotate in synchronism with the rotation of said first transmission member, said second transmission member having a rotation shaft arranged to be substantially orthogonal relative to the rotation shaft of said first transmission member, and wherein said scale is connected to said second transmission member.

2. A device according to claim 1, wherein said circuit board is composed of a printed circuit board.

3. A device according to claim 2, wherein said drive unit includes a motor arranged to rotate said first transmission member, and wherein lead wires which are arranged to supply power to said motor are connected to said printed circuit board.

4. A device according to claim 1, wherein each of said first and second transmission members is provided with a bevel gear, and wherein said first and second transmission members are coupled to each other by the bevel gears.

5. A lens barrel comprising:

a drive unit mounted on a body of said lens barrel and arranged to cause a lens to move in the direction of an optical axis;

a rotary scale disposed at said drive unit; and a light-emitting element and a light-receiving element, arranged on a circuit board of said lens barrel in a state of confronting each other through said scale, and wherein said drive unit includes a first transmission member which has a rotation shaft arranged to be substantially orthogonal relative to said circuit board and a second transmission member which is connected to said first transmission member and is arranged to rotate in synchronism with the rotation of said first transmission member, said second transmission member having a rotation shaft arranged to be substantially orthogonal relative to the rotation shaft of said first transmission member, and wherein said scale is connected to said second transmission member.

6. A lens barrel according to claim 5, wherein said circuit board is composed of a printed circuit board.

7. A lens barrel according to claim 6, wherein said drive unit includes a motor arranged to rotate said first transmission member, and wherein lead wires which are arranged to supply power to said motor are connected to said printed circuit board.

8. A lens barrel according to claim 5, wherein each of said first and second transmission members is provided with a bevel gear, and wherein said first and second transmission members are coupled to each other by the bevel gears.

9. A camera having a lens barrel according to any of claims 5 to 8 and arranged to control the movement of said lens by using an output of said light-receiving element.

* * * * *